U S 011558949B2

United States Patent
Kuenzler

(10) Patent No.: US 11,558,949 B2
(45) Date of Patent: Jan. 17, 2023

(54) IDENTIFICATION OF LIGHTING FIXTURES FOR INDOOR POSITIONING USING COLOR BAND CODE

(71) Applicant: CURRENT LIGHTING SOLUTIONS, LLC, East Cleveland, OH (US)

(72) Inventor: Glenn Howard Kuenzler, East Cleveland, OH (US)

(73) Assignee: CURRENT LIGHTING SOLUTIONS, LLC, Beachwood, OH (US)

( * ) Notice: Subject to any disclaimer, the term of this patent is extended or adjusted under 35 U.S.C. 154(b) by 0 days.

(21) Appl. No.: 17/287,314

(22) PCT Filed: Oct. 25, 2019

(86) PCT No.: PCT/US2019/058081
§ 371 (c)(1),
(2) Date: Apr. 21, 2021

(87) PCT Pub. No.: WO2020/086972
PCT Pub. Date: Apr. 30, 2020

(65) Prior Publication Data
US 2021/0360765 A1 Nov. 18, 2021

Related U.S. Application Data

(60) Provisional application No. 62/751,479, filed on Oct. 26, 2018.

(51) Int. Cl.
*H05B 47/105* (2020.01)
*G06K 7/14* (2006.01)
(Continued)

(52) U.S. Cl.
CPC .......... *H05B 47/19* (2020.01); *G06K 7/1443* (2013.01); *G06V 10/56* (2022.01); *H05B 47/105* (2020.01)

(58) Field of Classification Search
CPC ...... H05B 47/10; H05B 47/105; H05B 47/19; H05B 47/195; G06K 7/1443; G01C 21/206; G06V 10/56
See application file for complete search history.

(56) References Cited

U.S. PATENT DOCUMENTS 10,740,503 B1 * 8/2020 Wodrich ................ G06Q 99/00
10,824,774 B2 * 11/2020 Santarone ................ G01S 5/02
(Continued)

FOREIGN PATENT DOCUMENTS

JP  2016071663 A  5/2016
JP  2016540959 A  12/2016
(Continued)

OTHER PUBLICATIONS

International Search Report and Written Opinion dated Mar. 11, 2020 which was issued in connection with PCT Application No. PCT/US2019/048097 which was filed on Aug. 26, 2019.
(Continued)

*Primary Examiner* — Haissa Philogene
(74) *Attorney, Agent, or Firm* — Buckley, Maschoff & Talwalkar LLC

(57) ABSTRACT

Image data of a light source comprising a surface is obtained using an optical sensor. The surface includes a color band code comprising an array of color regions at least partially modifying visible light of the light source prior to the light impinging the optical sensor. One or more characteristics of the color band code are determined based on the image data that is obtained. Determining a unique identity of the light source based on the determined one or more characteristics
(Continued)

of the color band code is performed, or determining a location within a structure associated with the light source based on the determined one or more characteristics of the color band code is performed.

19 Claims, 10 Drawing Sheets

(51) Int. Cl.
*H05B 47/19* (2020.01)
*G06V 10/56* (2022.01)

(56) References Cited

U.S. PATENT DOCUMENTS

| | | | |
|---|---|---|---|
| 2010/0213259 A1* | 8/2010 | Gao | G06K 7/10841 235/469 |
| 2014/0086590 A1* | 3/2014 | Gan | G06Q 30/02 398/118 |
| 2015/0163459 A1 | 6/2015 | Jovicic et al. | |
| 2015/0323647 A1 | 11/2015 | Jones et al. | |
| 2016/0139232 A1 | 5/2016 | Ganick et al. | |
| 2016/0299214 A1 | 10/2016 | Engelen et al. | |
| 2018/0007247 A1* | 1/2018 | Aggarwal | H04B 10/116 |
| 2018/0276523 A1* | 9/2018 | Okada | G06K 19/16 |
| 2019/0280769 A1* | 9/2019 | Verbrugh | H05B 47/125 |
| 2020/0284883 A1* | 9/2020 | Ferreira | G01S 17/931 |

FOREIGN PATENT DOCUMENTS

| | | |
|---|---|---|
| KR | 101359345 B1 | 2/2014 |
| KR | 1020150069655 A | 6/2015 |
| WO | 2017058107 A1 | 4/2017 |
| WO | 2018015176 A1 | 1/2018 |

OTHER PUBLICATIONS

International Search Report and Written Opinion dated Feb. 26, 2021 which was issued in a counterpart PCT application PCT/US2019/058081 which was filed on Oct. 25, 2019.

International Search Report and Written Opinion dated Feb. 26, 2020 which was issued in connection with PCT Application No. PCT/US2019/058081 which was filed on Oct. 25, 2019.

\* cited by examiner

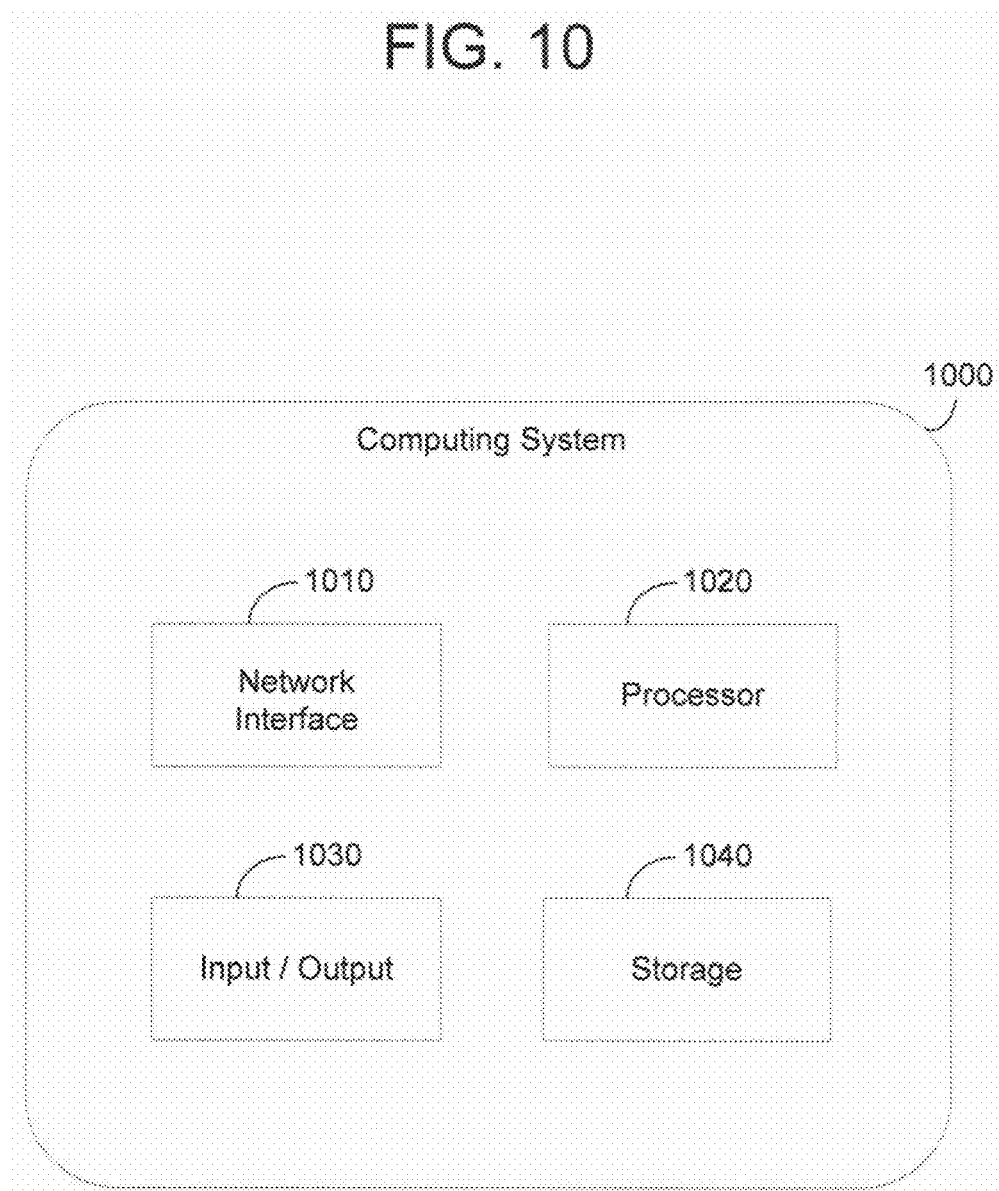

IDENTIFICATION OF LIGHTING FIXTURES FOR INDOOR POSITIONING USING COLOR BAND CODE

BACKGROUND

Indoor positioning systems typically include a network of devices used to locate objects or people within a defined space such as a retail environment or a warehouse. Indoor positioning systems are often used in environments in which global positioning systems (GPS) or other satellite technologies may be inoperable or of insufficient precision. For example, retailers often wish to determine the location of customers within a retail environment for a variety of purposes such as offering promotions and customer navigation. Indoor positioning systems typically utilize radio technologies to produce distance measurements from mobile radio devices to anchor nodes, such as WiFi access points or Bluetooth beacons, with known fixed positions within the defined space. However, many existing indoor positioning system are often subject to a variety of problems such as radio interference within the environment which can negatively affect the accuracy or efficacy of indoor positioning.

SUMMARY

Embodiments of the present disclosure relates to systems, methods, and implements for uniquely identifying light sources such as a light fixture using color band codes.

Embodiments of the present disclosure may provide a system for unique identification of a light source. The system may comprise a lighting assembly comprising a light source emitting substantially white light, and a light transmissive surface through which passes at least a portion of the emitted light. The light transmissive surface comprises a plurality of transmissive color regions configured to absorb at least a portion of the emitted substantially white light, where the color regions are arranged to indicate data. Alternatively, the lighting assembly comprises a light source and a light-receiving surface selected from the group consisting of light-transmissive surface, light-reflective surface and combinations thereof, wherein the light receiving surface comprises a plurality of transmissive color regions configured to absorb at least a portion of the emitted substantially white light, where the color regions are arranged to indicate data.

Embodiments of the present disclosure may also provide a method, the method comprising obtaining image data from an optical sensor observing a light source, where the light source comprises a transmissive surface. The transmissive surface including a color band code comprising an array of color regions that at least partially modify visible light from the light source prior to the light impinging the optical sensor. The method further comprises determining one or more characteristics of the color band code based on the image data that is obtained. The method further performs one or more of the following steps: (i) determining a unique identity of the light source based on the one or more characteristics of the color band code that are determined, and/or (ii) determining a location of the light source.

The optical sensor may comprise at least one of camera, imaging unit, colorimeter, or spectrometer. The optical sensor may be a camera of a mobile electronic device. The color band code may be adhered to a light-transmissive surface of the light source. Alternatively, the color band code may be adhered or affixed to another light-receiving surface such as reflective surface in association with a light source. The color band code may be formed of separate color regions on the transmissive surface, or may be a unitary article comprising a plurality of color regions. The color band code may be an adhesive transparency ("sticker") comprising a plurality of light-transmissive color regions and one or more white or colorless (or transparent) regions. Note that when a transmissive sticker comprising color regions is applied to a surface, the color regions typically may also be transmissive, albeit with color-filtering effect.

Embodiments of this disclosure also provide an electronic mobile device comprising an optical sensor configured to obtain image data of a light source comprising a transmissive surface, where the transmissive surface includes a color band code comprising an array of color regions capable of at least partially modifying visible light of the light source prior to its light impinging the optical sensor. The electronic mobile device may further comprise one or more associated processors configured to determine one or more characteristics of the color band code based on the image data that is obtained, where the one or more associated processors are also configured to (i) determining a unique identity of the light source based on the one or more characteristics of the color band code that are determined, and/or (ii) determining a positioning location within a structure of the light source and/or the electronic mobile device, based on the one or more characteristics of the color band code that are determined. The one or more associated processor may be components of the electronic mobile device, or they may be remote from the electronic mobile device, e.g., cloud-based.

Embodiments of this disclosure also provide a non-transitory computer-readable medium having stored thereon instructions which when executed by a processor cause the processor to receive image data of a light source comprising a surface from an optical sensor, the surface including a color band code comprising an array of color regions at least partially modifying visible light of the light source prior to the light impinging the optical sensor; determine one or more characteristics of the color band code based on the image data that is obtained; and further performing one or more of the following steps: (i) determine a unique identity of the light source based on the determined one or more characteristics of the color band code, or (ii) determine a location within a structure associated with the light source based on the determined one or more characteristics of the color band code.

Embodiments of this disclosure also provide a luminaire comprising a light source emitting visible light and a light-receiving surface selected from the group consisting of light-transmissive surface, light-reflective surface and combinations thereof, the light source in optical communication with the light-receiving surface. The light-receiving surface comprises a color band code including an array of color regions, the array of color regions at least partially modifying the visible light prior to the light impinging an optical sensor of an electronic mobile device. The color band code encodes at least machine-readable data indicative of a unique identifier of the luminaire.

BRIEF DESCRIPTION OF THE DRAWINGS

FIG. 10 is a diagram illustrating a computing system that can be used in the examples herein in accordance with some embodiments.

Figure 1:
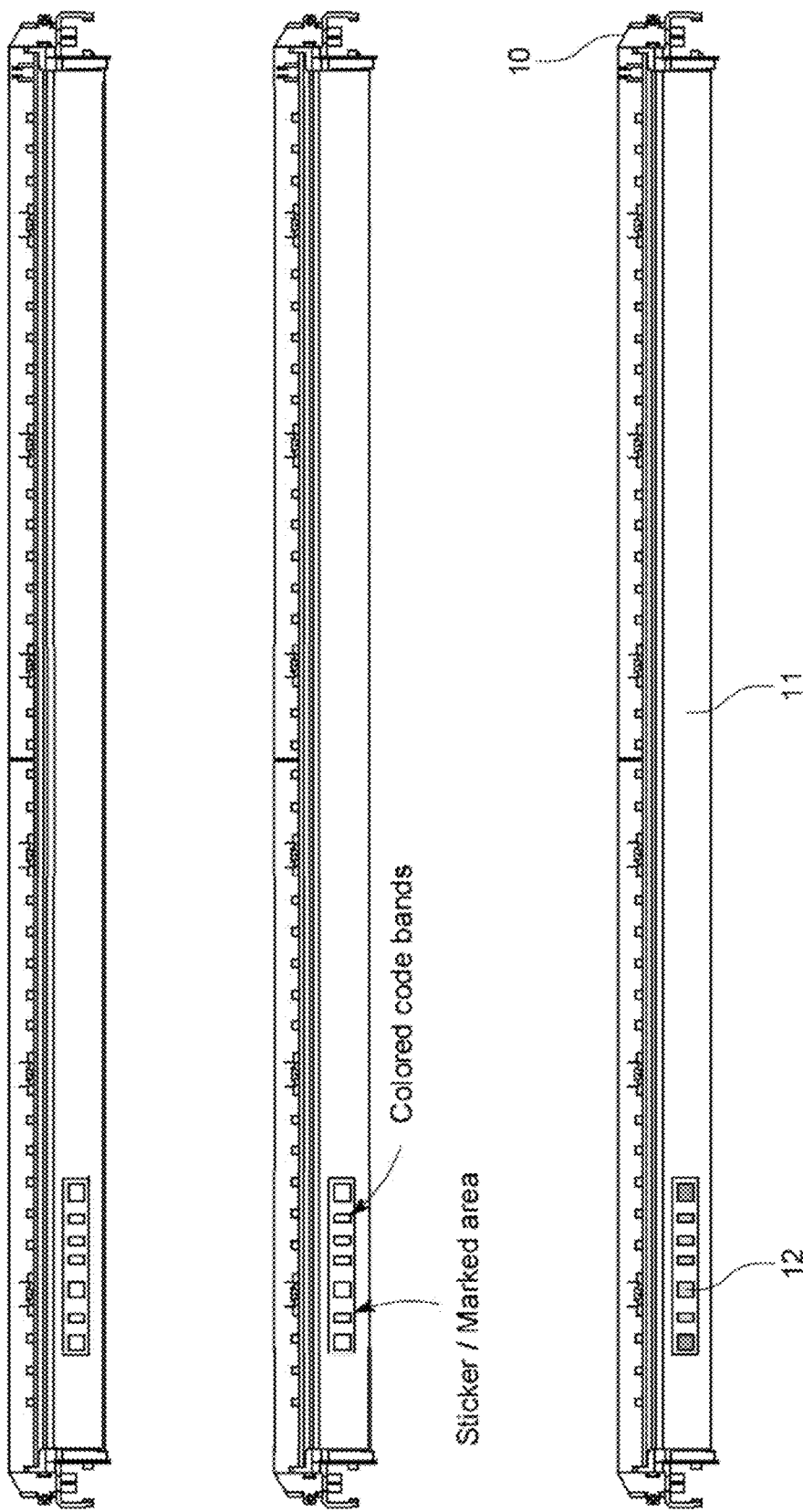
FIG. 1 is a schematic side view of a fixture having a color band code comprising color regions affixed thereto in accordance with an embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure relates to systems, methods, and implements for uniquely identifying light sources, such as a light fixture, using color band codes affixed to the light source. In one or more embodiments, the color band code is affixed to a light source and is configured to be imaged by an optical sensor and decoded to obtain a unique identifier represented by the color band code. In various embodiments, the light source is typically a source of visible light, such as a source of homogeneous visible light, where homogeneous may be defined as being where the intensity of the visible light is substantially uniform in color across an external surface through which the visible light passes, for receipt by the optical sensor. In certain embodiments, the intensity of the visible light may be allowed to vary considerably without affecting the quality of reading of the color band code.

In one or more embodiments, the visible light is preferably substantially white light, of any effective color temperature, e.g., 2000-10000 K. The visible light may also be composed of sun light, i.e., light from the sun. In some embodiments, the light source may provide a homogeneous white backdrop for the color band code. It should be noted, however, that the light source does not have to be any particular intensity of white or any particular color temperature; it is merely advantageous that the light source may provide a homogeneous light source to facilitate the methods of the present disclosure. Another feature which may be associated with the visible light emitted by the light source is that may be a full-spectrum light source, that is, one which supplies light across the visible spectrum. Alternatively, the light source emitting visible light may comprise an RGB LED light source (e.g., an array of light emitting diodes comprising red, green, and blue colors).

In one or more embodiments, a system for unique identification of a light source includes a lighting assembly comprising a light source emitting substantially white light, and a light transmissive surface through which passes at least a portion of the emitted light. The light transmissive surface comprises a plurality of transmissive color regions configured to absorb at least a portion of the emitted substantially white light, where the color regions are arranged to indicate data. Alternatively, the lighting assembly comprises a light source and a light-receiving surface selected from the group consisting of light-transmissive surface, light-reflective surface and combinations thereof, wherein the light receiving surface comprises a plurality of transmissive color regions configured to absorb at least a portion of the emitted substantially white light, where the color regions are arranged to indicate data. In one or more embodiments, a transmissive surface is a surface of the light source through which at least some of the visible light from the light source passes. In certain the embodiments, the transmissive surface may be an exterior surface of an envelope of a lamp; or the transmissive surface may be an exterior, light-transmissive surface of a light fixture; or the transmissive surface may be an interior or exterior surface of a light-transmissive surface in optical communication with a light fixture. Alternatively, the transmissive surface may be a window through which any visible light passes; such as a skylight through which visible light passes.

In other embodiments, the color band code may be included on a reflective surface associated with a light fixture instead of a light transmissive surface. Such embodiments may be implemented, for example, for light fixtures that do not generally spread light using a transmissive diffuser material but instead use a reflective surface such as a purely reflective surface to distribute emitted light.

One or more embodiments may also prove a method including obtaining image data from an optical sensor observing a light source, where the light source comprises a transmissive surface or reflective surface including a color band code having color regions that at least partially modify visible light from the light source prior to the light impinging the optical sensor. The method may further include determining one or more characteristics of the color band code based on the image data that is obtained. The method may further perform one or more of the following steps: (i) determining a unique identity of the light source based on the one or more characteristics of the color band code that are determined, and/or (ii) determining a location of the light source.

In various embodiments, the optical sensor may include at least one of camera, imaging unit, colorimeter, or spectrometer. In certain embodiments, the optical sensor may be a camera of a mobile electronic device or other component of an imaging unit which comprises the optical sensor. In many exemplary embodiments, the optical sensor may be a camera on a mobile device, such as a smart phone. Such cameras often have the ability to measure or distinguish between various colors of visible light, and this color-discriminating ability may be exploited in embodiments of the invention.

Embodiments of this disclosure also provide an electronic mobile device comprising an optical sensor configured to obtain image data of a light source comprising a transmissive surface, where the transmissive surface includes a color band code comprising color regions capable of at least partially modifying visible light of the light source prior to its light impinging the optical sensor. The electronic mobile device may further comprise one or more associated processors configured to determine one or more characteristics of the color band code based on the image data that is obtained, where the one or more associated processors are also configured to (i) determining a unique identity of the light source based on the one or more characteristics of the color band code that are determined, and/or (ii) determining a positioning location within a structure of the light source and/or the electronic mobile device, based on the one or more characteristics of the color band code that are determined. The one or more associated processor may be components of the electronic mobile device, or they may be remote from the electronic mobile device, e.g., cloud-based.

In certain embodiments, the color band code may be adhered to a light-transmissive surface of the light source. Alternatively, the color band code may be adhered or affixed to another light-receiving surface such as reflective surface in association with a light source. The color band code may be formed of separate color regions on the transmissive or reflective surface, or may be a unitary article comprising a plurality of color regions. In certain embodiments, the color band code may be an adhesive transparency ("sticker") comprising a plurality of light-transmissive color regions and one or more white or colorless (or transparent) regions. It should be noted that when a transmissive sticker comprising color regions is applied to a surface, the color regions typically may also be transmissive, albeit with color-filtering effect.

For purposes of this disclosure, a color band code typically may be an optical, machine-readable representation of data. The data usually comprises a unique identifier. The unique identifier may be a globally unique identifier, or a local unique identifier. A "local" unique identifier is a numeric or alphanumeric or other like indicator that does not repeat within a defined space where indoor positioning capability or light-source-identification is desired, such as a facility, building, garage, warehouse, or other indoor or outdoor location.

In certain embodiments, the physical nature of the color band code includes color regions or blocks applied to a transmissive surface of a light source (or a reflective surface of a luminaire) in the form of an adhesive sticker. In this example, the color band code is printed onto a transparency and adhered to an external surface of a luminaire. In one embodiment, the color regions may be applied to the light-transmissive surface as a plurality of color adhesive stickers, or as a single adhesive sticker comprising a plurality of color regions. Alternatively, the color regions comprising a color band code may be printed directly onto a transmissive surface, for example by transfer printing. Alternatively, such color band code may be provided in the form of a sleeve or some other applied substrate that does not itself constitute a sticker. Other methods for applying color regions to a transmissive surface (or to a transparent substrate which is then applied to a transmissive surface) may include applying a dye and/or pigment by painting, or printing, transfer printing, jet printing, ink jet printing, sputtering, spraying, stenciling; or the like. As further alternative, the color regions may be embodied as colored plastic parts (e.g., yellow color), affixed or applied or clipped to the transmissive surface or to other parts of a light fixture.

Alternatively, the color band code comprising color regions may be embodied as an opaque or dark layer (or even a light-transmissive layer) upon which is carried regions or layers of reflective colored pigment or dye (e.g., reflective colored ink). Such a color band code may take the form of an opaque (or even a light-transmissive) label upon which is printed regions of reflective colored ink. Yet furthermore, the color band code comprising color regions may be embodied as a photocode constructed by printing (or otherwise applying) regions of reflective colored pigment or dye upon a light-receiving surface of a light source. These reflective layers would typically be illuminated by the associated visible light source, or by a neighboring visible light source.

In one or more embodiments, placement of colored transparent band codes on a transmissive or reflective surface may be performed by any effective means to align the colored transparent color band codes (e.g., sticker(s)) onto the surface (e.g., lens, diffuser) of a light source (e.g., luminaire), to avoid problems such as a sticker being twisted when applied. For example, a custom jig may be used to place the sticker(s); or, reference lines may be included on such sticker, to help in placement. Alignment methods should be chosen to minimize interference with the ability of an optical sensor to read the encoded data of the color band code. In alternative embodiments, the color band code comprising color regions can be placed on non-light-transmissive areas of a lighting apparatus, provided that the optical sensor can interpret the data in the color band code and therefore facilitate position triangulation.

In some embodiments, the color band code comprising color regions may be configured as a "linear" color band code, in the sense that the color regions are "read" in a one dimensional fashion. Alternatively, the color band code may comprise color regions arrayed in two dimension, to form any two-dimensional color band code encoding data, including many known 2-dimensional data matrix codes.

In certain embodiments, the location of the color band code including color regions relative to a light source may include affixing the color band code directly to the surface of a light-emitting region of a light source. Examples of this situation may include an interior surface of a window or of a skylight. Other embodiments may include placing a sticker on an envelope or other external transmissive surface of a lighting apparatus, such as an LED tube lamp. Such a color band code sticker as is disclosed in the present disclosure, may also be placed on a reflective surface, such that light from a given light source may reflect from the reflective surface and thus pass through the color regions. The visible light from said given light source, when so reflected, will be modified in its color content by the color regions.

For a color band code sticker applied, affixed, or adherent to a reflective surface, light passes through such a sticker twice (i.e., an inbound and an outbound path), thus there is an increased amount of color filtering provided by the color regions of the sticker. In general, a color band code sticker may be supplied to any surface having transmissive or reflective qualities. The visible light from the light source may have an appearance that is substantially white. The color band code comprising color regions will modify the tristimulus bands of the light that passes through the color band code, and thus the optical sensor of an electronic mobile device may record or analyze these changes in the tristimulus bands.

In one or more embodiments, the color band codes (which may be embodied, for example, as translucent stickers for application to a transmissive surface of a light source), may be encoded with data used to identify a light source in a field of view. The light source may be identified via a unique identifier (e.g., a serial number), which may be locally unique or globally unique. Alternatively or in addition, the color band code may comprise other encoded data, such as data pertaining to a light fixture, its brand, its driver identification, its power requirements, its commercial identifiers, or any other data. In some embodiments, the color band code may include additional data which identifies a kind or type of color band code used (e.g., a two-dimensional code, etc.), or identifies a bit size of the code. Such additional data may assist a computer-implemented method associated with an optical sensor to determine the expected code dimensions.

In some embodiments, a human-readable version of data may additionally be present on the color band code, in addition to the machine-readable color regions, which may assist in a commissioning process of an indoor positioning system or for other purposes. This may be accomplished by including data in plaintext on a sticker, in such a manner that the plaintext is not noticeable (or is disregarded) by the image-processing algorithm associated with the optical sensor. The text may exist as small black or any color differing from the background on a region of the sticker, or can be white/clear lettering. The size of the data contained in the color band code may be any number of bits, such as 8-bits or 16-bits or higher; other bases besides binary may be used, giving rise to the encoding of other values. If the number of bits written is too few, then the lighting apparatus may not be uniquely identifiable within a defined location due to overlap or collision in the namespace; if the number of bits is too dense (closely spaced), then each color region corresponding to a bit of information may be too small in size as to be clearly discernable at a required distance.

In one or more embodiments, a color region is a component of the color band code that is light transmissive or light reflective and includes one or more colors that are measurable different from the source color of the visible light. In one example, the color band code may be embodied as an 8-bit color band code. For example, yellow regions (e.g., yellow lines) can denote a binary one or zero, whereas clear, colorless, or white regions (e.g., lines) can denote the opposite bit (zero or one, respectively). One advantage of using a yellow color region, is that yellow color results from blocking or filtering the blue "channel" of the visible white light from the light source (e.g., a white LED fixture). Yellow against a white background is relatively more difficult to detect by human eyes, making the presence of such color region least noticeable; and the "lost" blue color component of the visible light is in a region of the spectrum where human eye sensitivity is low, meaning the reduction (i.e., loss) of total luminous flux from the fixture is minimized. Analogously, the red channel of visible white light emanating from a light source may be blocked, filtered, or otherwise reduced to produce what the human eye would perceive as a cyan color, also with minimal loss of luminous flux.

In an example where yellow regions are bounded by cyan boundary regions, an embodiment of a computer-implemented method that carries out the image analysis may examine all three channels of color in the visible light acquired by the optical sensor from the light source: e.g., the red, green, and blue channels. The red channel may be most indicative of where the cyan color regions are, and the blue channel may be most indicative of where yellow color regions are; but, the green channel may be largely unaffected by the presence of yellow and cyan color regions. Since most of the lumens of a visible light source are contained in the green band of color, this particular choice of colors will likely have the least impact upon lumen output of a light source. As a practical implementation, the use of yellow color regions for forming color band codes on light sources for identification, may have advantages in that the human eye is least receptive to the presence of a yellow color against a white light background. If a color band code is affixed to a lens/diffuser of a ceiling light fixture, and the color band code comprises pale yellow regions, this will minimize the appearance of a color band code sticker attached to the lens/diffuser of the ceiling light fixture. A yellow color region illuminated via a white-light background, is generally somewhat difficult to perceive by the human eye, relative to other color combinations, yet offers ease of detection for the imaging unit.

In certain embodiments, the color band code may be composed solely of spaced-apart regions of a single color (e.g., yellow), without using regions of a second color to denote a boundary or a head/tail of the color band code. However, this may complicate the associated method for determining the data content of the color band code, since the computer-implemented method for reading the color band code may not always be able to determine if the entire color band code is in the field of view of the optical sensor. Thus, in other embodiments a color band code may typically benefit from secondary (but not opaque) regions that denote the boundaries of the color band code to facilitate machine-reading and orientation of the color band code sequence. In one example, an 8-bit color band code that uses yellow-colored bands/line (and colorless/white bands), typically requires a boundary so that the imaging unit can determine the beginning and end of the data encoded by the color band code. The boundary may be a region of different color from the color of the bands. One choice for color of the boundary region may be cyan, which depresses, blocks, or filters the red channel of the visible light from the light source, and generally does not depress the green or the blue channels. Once image data is acquired by the optical sensor, steps of a computer-implemented method may locate the brightest object in the field of view of the optical sensor, which will typically represent a light fixture. Once the computer-implemented method acquires a fix on a given light source, the computer-implemented method will subsequently search for two cyan-colored regions of the image data. In this example, the two cyan regions that act as a boundary for the color band code may have different sizes. That is, one of the cyan regions will be smaller than another cyan region, since it may be important to delineate which of the boundary markers denotes a beginning (or header) of the color band code and which one is an end (or tail) of the color band code. In an example, a camera of an electronic mobile device may perceive these respective boundary regions as having a different number of pixels. For convenience, one may choose to have the larger cyan region denote the beginning of the color band code, and the smaller cyan region to denote the tail (or vice versa). The computer-implemented method will be configured to determine which size corresponds to which type of boundary.

Embodiment of a computer-implemented method may be further explained by examining what an optical sensor detects on a red channel and a blue channel of the visible light which impinges on the optical sensor. The red channel is depressed by the presence of a cyan region in a color band code. Therefore, embodiments of a method examines the red channel and determines where it is depressed the most, and since this correlates to the location of the cyan regions, the method will determine the point(s) in the acquired images which has the greatest red depression. Subsequent to this step, the computer-implemented method may then locate the data bits of the color band code located between the points representing the centroids of the cyan boundary regions. If the color band code is written in eight sequential regions between the cyan ends, the computer implemented method may then scan these regions and report an 8-bit binary number composed of either white or yellow responses.

However, in many alternative embodiments, a header region and a tail region may be denoted by different colors, not just same colors of different size. For example, a header may be cyan and a tail may be magenta, or vice versa. The presence of a magenta band would typically be detected as a depression in a green channel.

One or more embodiments of a computer implemented method of the present disclosure determines a location of color regions in a color band code. Such method may employ a ratio of the color channels. For example, if, upon scanning an acquired image, a change in a ratio of red to green is detected, then the method may infer from this that a cyan boundary region has been detected. Now, for many white light sources, the ratio between color channels will be close to unity if the color of the white light source is not modified by a color region. However, if during scanning across an acquired image, a ratio between different color channels deviates from unity by more than a threshold value, then it may be deduced that a color region has been detected (by "color region" it is intended to include, for example, either a cyan header/tail region, and/or a yellow data region). Advantageously, if the visible light from the light source is impaired by a shadow on the color band code, this alone would likely not significantly affect the ratio of unity between the various color channels in the visible white light from the light source.

It is noted that various light fixtures exist or are circulated in commerce having different color temperatures, depending upon user preference or other factors. The ratio of various color channels (red to green, green to blue, etc.), may differ depending on the color temperature of the fixture. However, a computer-implemented method may be configured such that it does not depend upon knowledge of the color temperature of the fixture, and does not depend upon prior knowledge of what the "usual" or "normal" ratio may be between color. The method may simply locate deviations in ratios of color channels from whatever the normal ratio is for that fixture or light source. The computer-implemented image processing method may scan the bright areas of a fixture/light source, and use such scan to determine what the normal ratios are between color channels for that particular light source; bright areas of a fixture usually will take up most of the observable surface area of a light fixture if a color band code takes up only a minor portion of this area. The regions that contain either cyan color or yellow color will be (in this example) the only regions where the red/green and blue/green color-channel ratios deviate from whatever the normal ratio may be for the given fixture. By "deviate", is meant a deviation above a selected threshold. As an alternative to employing a ratio between color channels in order to determine the presence or absence of a color region of the color band code, an image-processing method may use a mere absolute difference between intensities in various color channels. Generally, an image-processing method may seek differences between intensity of color channels for each pixel that it has in its field of view when viewing a light fixture.

For improved results, in certain embodiments the computer-implemented image processing method may locate not merely the center of a header region and a center of a tail region, but also centers for each of the yellow color regions that denote the bits of information. In embodiments, the computer-implemented image processing method does not depend upon locating any other features of a fixture other than the presence of the color regions.

One advantage for using color regions as part of a color band code system, as opposed to purely opaque bands with no color regions, is that it overcomes ambiguities attendant to the use of opaque bands. If one were to place some opaque bands to obscure the emission of light from a fixture, it may suffer from the problem of front lighting. That is, an opaque band may be illuminated by light from another source, such as a spotlight or another fixture or incident sunlight, making that object appear bright. This will impair the ability of an algorithm to determine the presence or absence of that opaque band.

In some embodiments, a computer-implemented image-processing method may extract the encoded data from the color band code while accommodating the presence of impediments or obstacles in from of the visible light source that may be present, such as hanging signs or human heads visible to the optical sensor in a given space while the optical sensor is acquiring imaging data of the color band code. The present disclosure also comprehends one or more image-processing steps of a method that may compensate for visualization of the color band code from various non-optimum angles. Color band codes as described herein may not prevent an obstacle from interfering with the code, but unlike monochrome methods, embodiments described herein are able to detect an obstruction and reject the code rather than interpreting the code with a wrong value. For example, in a monochrome doe a shadow or obstruction may cause an appearance as if there were a "zero" in the code.

In situations where an optical sensor is far away from a color band code, there may be the possibility of misreading the encoded data in the color band code, since the color band code will appear smaller. In one or more embodiments, computer-implemented methods of this disclosure will benefit from steps which avoid a false reading of a color band code, because such could lead to an inaccurate computation of the position of the optical sensor. To assist in detecting errors and rejecting false readings, one or more embodiments may add a parity bit into the color band code. Such a parity bit may be encoded such that it corresponds to a "1" if the sum of the bits in the color band code is odd, or a "0" if the sum of the bits in the code is even (or vice versa). If a reading error occurs on any bit or bits in the color band code, then there would be disagreement between the parity bit and the actual even/odd count of the observed bits observed. The method could then reject a reading as invalid, rather than reporting an incorrect value. The location of the parity bit is not particularly limited; it may be adjacent to the color regions of the color band code which encode the data, or it could be located distal from the color band code, or adjacent to the header or the tail of the color band code, if any. Naturally, many other kinds of error-checking are contemplated in this disclosure, such as CRC (cyclic-redundancy checksum), CRC32, or other checksums or hashes (e.g., MD5, SHA, etc.).

The present disclosure has heretofore focused on a system wherein the colors of the color band code typically may have only one of two levels of intensity: minimum color and maximum color. As would be understood, for any given color (such as red, green or blue), there can be many intensity levels based on sensitivity of the optical sensor, from 0 (completely dark) to 255 (the maximum intensity level for an 8-bit color system). For example, if transmitted red and transmitted green are both set to maximum (255), and combined with transmitted blue color at its maximum (255), then the resulting color is white. If transmitted blue is changed to its minimum intensity (0) without changing red and green, the resulting color is yellow, that results in a binary code of using white and yellow color regions, which would typically indicate that an 8-bit code would contain $2^8=256$ combinations. However, it is possible to set more than just two levels of intensity (i.e., other than minimum and maximum) to utilize multilevel shades of color with trinary or higher level logic.

For example, if one were to select from 0, 128 or 255 for the blue channel, the resulting colors would be yellow, light-yellow and white. For an optical sensor which is sufficiently sensitive to detect these three states, this would enable a "trinary" logic, providing a total number of combinations of $3^8=6,561$. If there are more levels of color intensity which can be discriminated, then even higher numbers of combinations may be possible (for example, $4^8=65,536$, $5^8=390,625$, etc.).

A higher bit density (and thus smaller color band code sticker) may be achieved by overlapping primary colors (for example, overlying a cyan code over a yellow code). Also, bits may be encoded as regions having different shades of the same color. For example, if a gap between color regions (or a colorless section of a sticker) denotes "0", a region of a first shade of yellow can denote "1" and a region of a second shade of yellow can denote "2", thus forming a color band code having a namespace spelled in base-3 arithmetic, instead of binary arithmetic.

Typically, an optical sensor, such as a camera of a mobile electronic device, may be capable of independently measuring the primary colors of red, green and blue. For such optical sensors, a system of identifying a light source may employ a color band code using multiple color which overlay each other. For example, for a color band code embodied in a sticker, one may print color regions onto the sticker using all two or three primary colors simultaneously. Each color region could contain separate values for red, green and blue. If one were to encode this using a binary approach (i.e., an approach where each color is set at minimum color intensity or maximum color intensity but not an intermediate intensity), the following combinations may be possible for red, green and blue, respectively:

[0,0,0]=black
[255,0 0]=red
[0, 255, 0]=green
[0, 0, 255]=blue
[255, 255, 0]=yellow
[255, 0, 255]=magenta
[0, 255, 255]=cyan
[255, 255, 255]=white This may provide an ability to encode three separate bits of information into a single color region/color block, since one can read the binary values of red, green and blue independently with the optical sensor. The following is an exemplary embodiment where color regions are generally linearly arrayed on a transmissive surface of a light source, to form a generally linear color band code. If one were to line up eight color regions in a row, but use either colors (rather than merely yellow color regions and colorless (white) color regions), one may be capable of storing 24 bits of information in the same physical space). Visually, such a color band code may appear to an ordinary observer to be a multi-colored strip, but the image analysis software associated with the optical sensor may be capable of interpreting each color as a specific number. Moreover, if the optical sensor were sufficiently sensitive to permit three levels of intensity of each primary color, one may encode $3^24=282$ billion combinations. Alternatively, a substantially linear color band code may be constructed having fewer than eight blocks or color regions, and yet still have a high data density to permit unique identification or encoding of information.

One or more embodiments are directed to triangulation of the position of an electronic device within an environment. Once a unique identifier (e.g., serial number) is obtained from reading or decoding the color band code associated with a light source, a system of indoor positioning may require knowledge of a position on the light source that the given serial number is associated with. In many embodiments, it may be convenient to have the system locate a center of the light source (e.g., a geometric center of a light fixture) and then be able to associate that center with the serial number, although this is not strictly necessary in all cases. Ideally, the optical sensor and its associated imaging unit may locate a point on a light source that can be identified as a light fixture, and, in association with the serial number or other data that is readable from the color band code, the imaging unit (using a computer implemented method) can perform a lookup on a map or other database to determine the location of that identified fixture. The lookup that is performed may depend upon the light source (e.g., fixture) having been accurately mapped during a prior commissioning step. Based on a prior commissioning process, the location of each fixture is generally known and stored within a lookup table or map or other database. But owing to the employment of a triangulation process based upon two known points in a field of view, and optionally further based on knowledge of the roll and pitch of the camera angle, then the position of the mobile device on that map can be ascertained and the distance from the user or mobile device to any given fixture may also be obtained.

In many indoor positioning systems, it is desired to locate a position within a structure within which the optical sensor of the imaging unit or mobile device is carried. Generally, in order to determine this position, a triangulation process may need to be performed. To facilitate this, the optical sensor may benefit from acquiring data from more than one light source (e.g., multiple light fixtures in a structure). Thus, an optical sensor may obtain image data from a second light source or fixture. The second light source may also possess a transmissive or reflective surface having a color band code comprising color regions or zones encoding unique identifying data. A purpose for acquiring the unique identifying data or serial number from a second light source is to determine the position of the optical sensor, and not just a position for the first light source that had been identified. Positioning of the mobile device or imaging unit may be determined by a triangulation process based on the two position of the two light sources that have been located on a map. Or, additionally, the electronic mobile device may be assisted in its process of triangulation by the use of internal gyroscopic or other motion and movement detection sensors that may be within the electronic mobile device. Persons of ordinary skill in the art would generally understand how to perform a triangulation of the location of a mobile device based on imaging of spaced-apart light sources of known position.

In an alternative embodiment, triangulation of the position of an electronic mobile device may be performed via locating two (or more) regions on the same light source (e.g., the same ceiling light fixture) that are spaced apart by a known distance. For example, in some embodiments, a color band code comprising color regions may have a color region (e.g., a cyan color region) denoting a head (or beginning) of the color band code, and another color region (e.g., another cyan color region) denoting the tail (or end) of the color band code. One of these regions may be larger in size than the other and thus occupy more pixels when imaged by the optical sensor. The optical sensor of the imaging unit (e.g., electronic mobile device) and associated computer implemented method may image both of these regions and employ their locations and known distances from each other to facilitate the determination of a triangulated position of the mobile device.

In one or more embodiments, a color band code comprising color regions may have a defined length dimension that is known to the computer implemented method, especially when the color band code is embodied as a sticker having a linear array of color regions. Provided that the length of this color band code is known to the method, then two reference points are capable of being supplied to the computer implemented method in order to perform the triangulation. Alternatively, the length or a longest dimension of an elongated fixture can also be used to provide two triangulation "fixes" for a method of determining the position of an electronic mobile device. By "length of a fixture" may mean a determination of two points, one at each end of the fixture. Image recognition methods, such as would be understood by persons of ordinary skill in the art, can be used to determine the location of the ends of an elongated fixture.

The characteristic length that is employed for triangulation of position of an electronic mobile device from points on a single fixture, may be supplied by one or more points that exist on the color band code per se, taken in combination with one or more points that exist elsewhere on the fixture, such as an end of a fixture or a center point of a fixture or some other defined point. Regardless of the method by which the characteristic length is acquired, such length may be used for determining the position of a mobile device that is underneath a single fixture.

Certain advantages may accrue to using a color band code to provide both identification of a fixture and provide a plurality of triangulation points. These advantages may include the fact that all the information needed to perform both triangulation and identification are contained in a single color band code (e.g., sticker). Thus, the use of a color region color band code is agnostic with respect to a fixture, or does not depend on a fixture of a particular shape or size or configuration.

In an exemplary embodiment, the plurality of color regions may be spaced apart from each other. The internal color regions may be yellow, and the boundary color regions may be cyan. The presence of a colored marker indicates a binary "1", whereas the absence of a colored marker (or an uncolored marker) indicates a binary "0". The sequence or array of colored markers and uncolored (or absent) markers, generate a binary number. The plurality of colored markers are bounded by a boundary color which is different from the color of the colored markers themselves. In one embodiment, the cyan header color region is made larger in size than a cyan tail color region, so that shows up as more pixels on a camera.

FIG. 1 is a schematic side view of a fixture 10 having a color band code 12 comprising color regions affixed thereto in accordance with an embodiment. In particular, it shows a linear fixture 10 for a plurality of LED packages that emit substantially white light, and these LED packages are at least partially enclosed by a diffusive envelope 11. On this diffusive envelope 11 is applied or affixed a color band code 12 comprising a plurality of color regions. In a particular embodiment, color band code 12 is embodied on a sticker applied to diffusive envelope 11. In one or more embodiments, the color bands of color band code 12 encode a locally or globally unique identifier.

Figure 2:
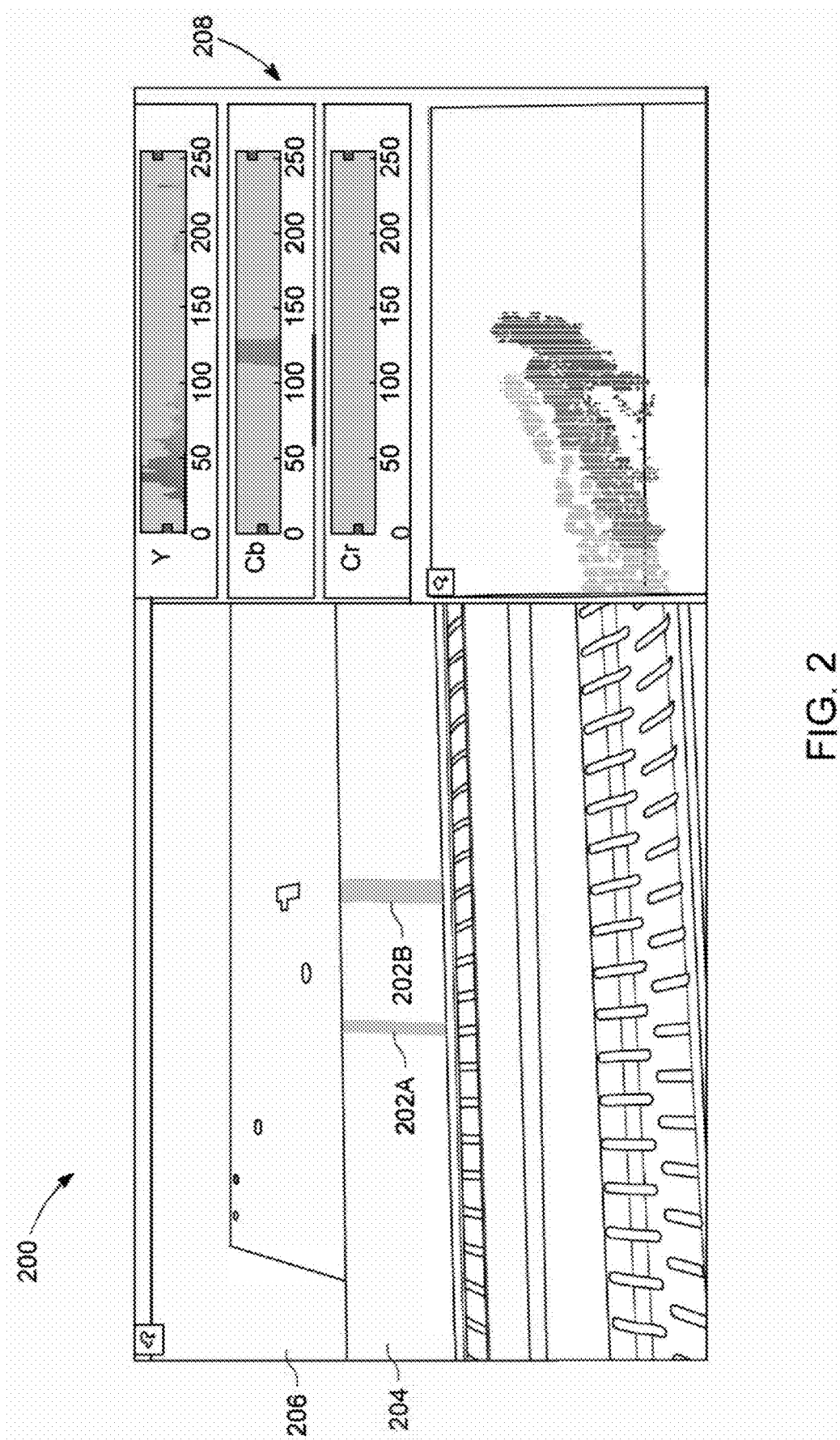
FIG. 2 shows a photograph of two yellow-color regions affixed to an exterior of a diffusive envelope of a white light fixture in accordance with an embodiment.

FIG. 2 shows a photograph 200 of two yellow-color regions 202A, 202B affixed to an exterior of a diffusive envelope 204 of a white light fixture 206 in accordance with an embodiment. In the embodiment illustrates in FIG. 2, the two yellow-color regions 202A, 202B have a rectangular band shape. FIG. 2 further illustrates a light level graph 208 of the white light fixture 206. Light level graph 208 includes a color space having a luminance component (Y) a blue-difference chroma component (Cb) and a red-difference chroma component (Cr). As shown in FIG. 2, the yellow-color regions 202A, 202B do not significantly affect the light level of white light fixture 206 as the yellow color has a lower impact on lumens.

Figure 3:
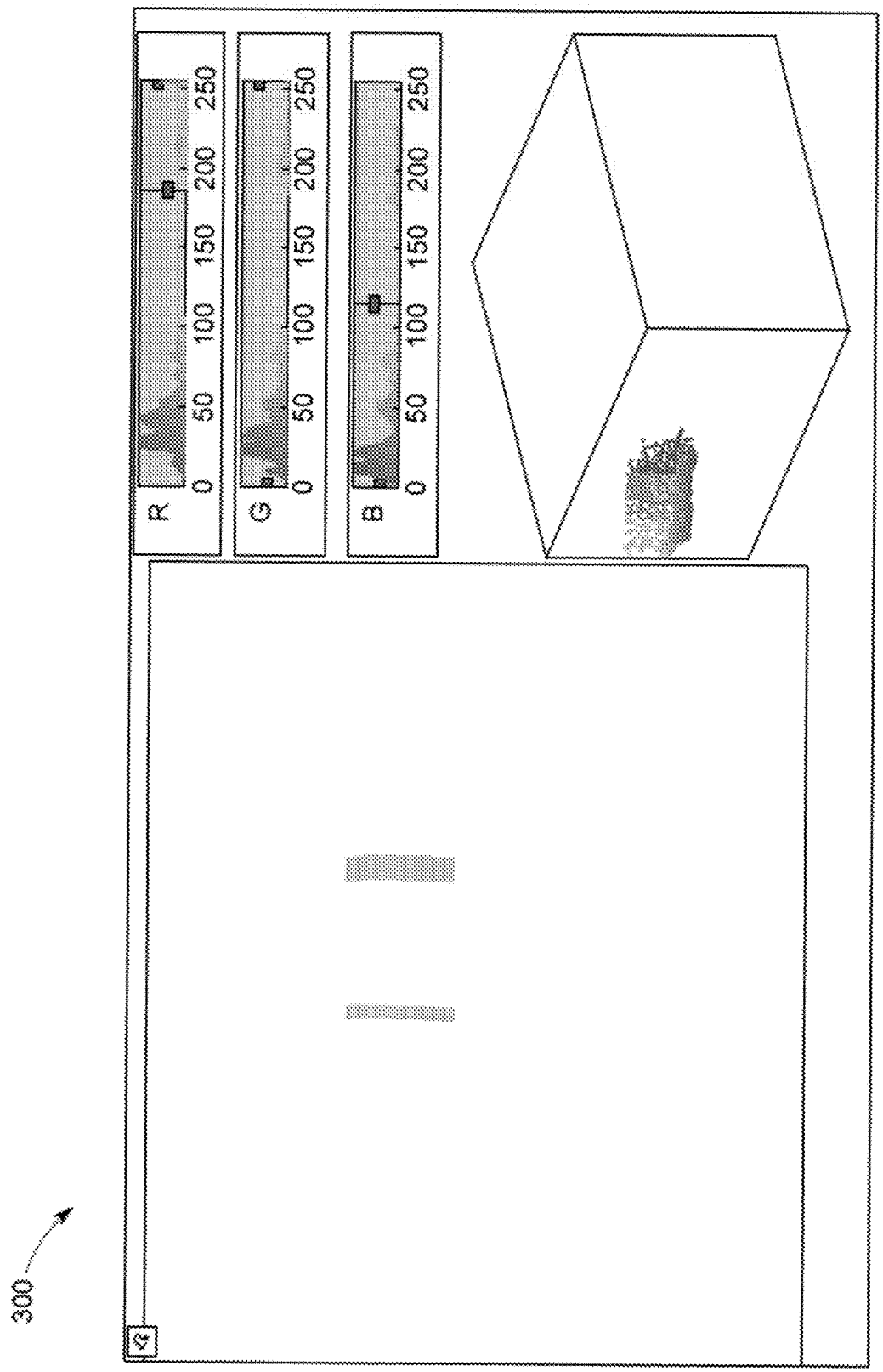
FIG. 3 shows a depiction of the color bands on the fixture of FIG. 2 with the white light portion mathematically subtracted to highlight only the yellow band color regions.

FIG. 3 shows a depiction 300 of the color bands on the fixture of FIG. 2 with the white light portion mathematically subtracted to highlight only the yellow band color regions 202A, 202B.

Figure 4:
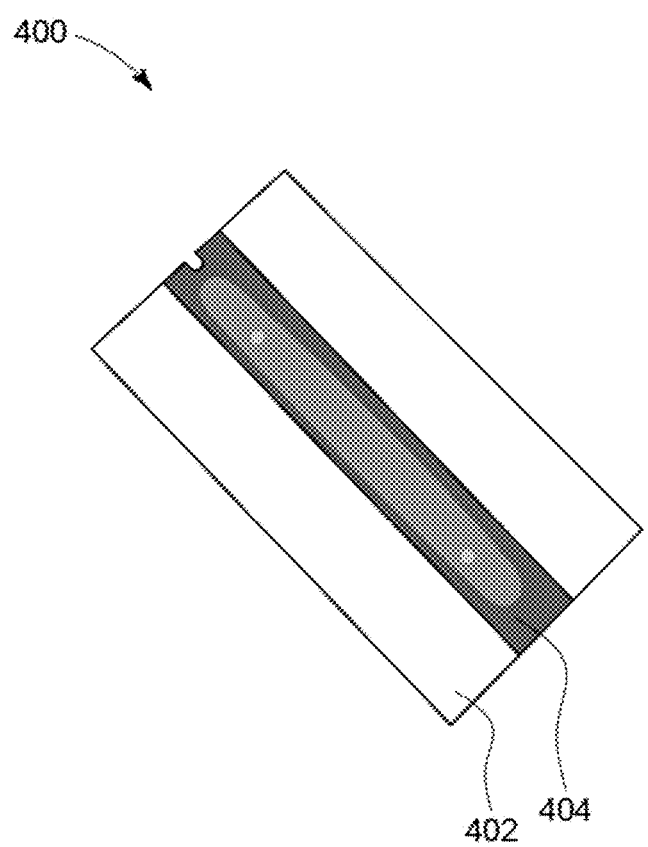
FIG. 4 shows a photograph of a bottom of a linear fixture having a diffusive envelope, and further having two pale yellow color regions on an exterior surface in accordance with an embodiment.

FIG. 4 shows a photograph 400 of a bottom of a linear fixture 402 having a diffusive envelope 404, and further having two pale yellow color regions on an exterior surface in accordance with an embodiment.

Figure 5:
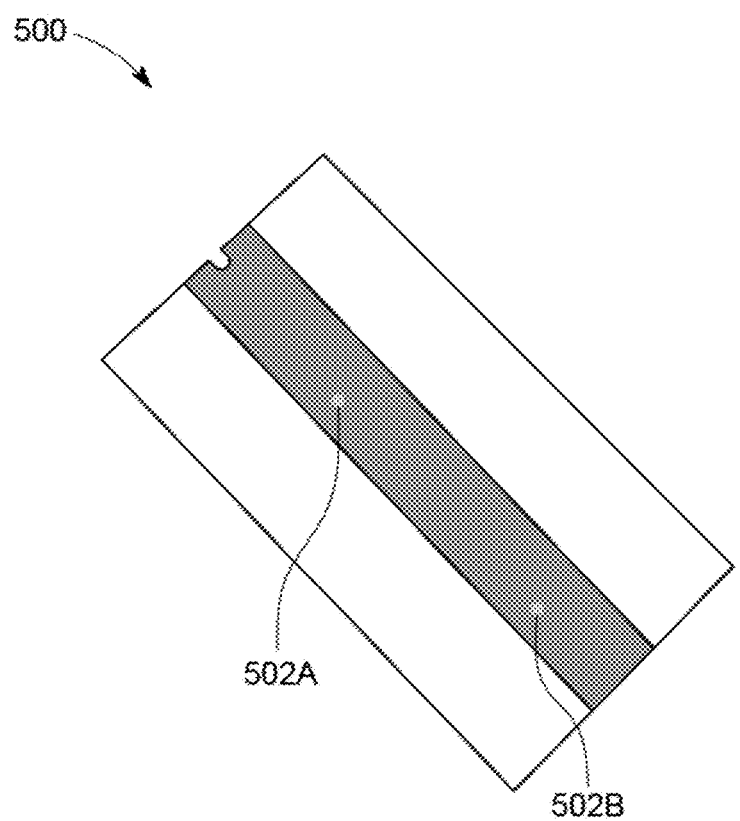
FIG. 5 shows the result of a detection method for the presence of color regions against a homogeneous white light background in accordance with an embodiment.

FIG. 5 shows the result of a detection method 500 for the presence of color regions against a homogeneous white light background in accordance with an embodiment. In the embodiment illustrated in FIG. 5, two centroids 502A, 502B of the color regions have been determined using detected changes in each of the tristimulus values for the image data acquired by a camera of an electronic mobile device such as a smartphone.

Figure 6:
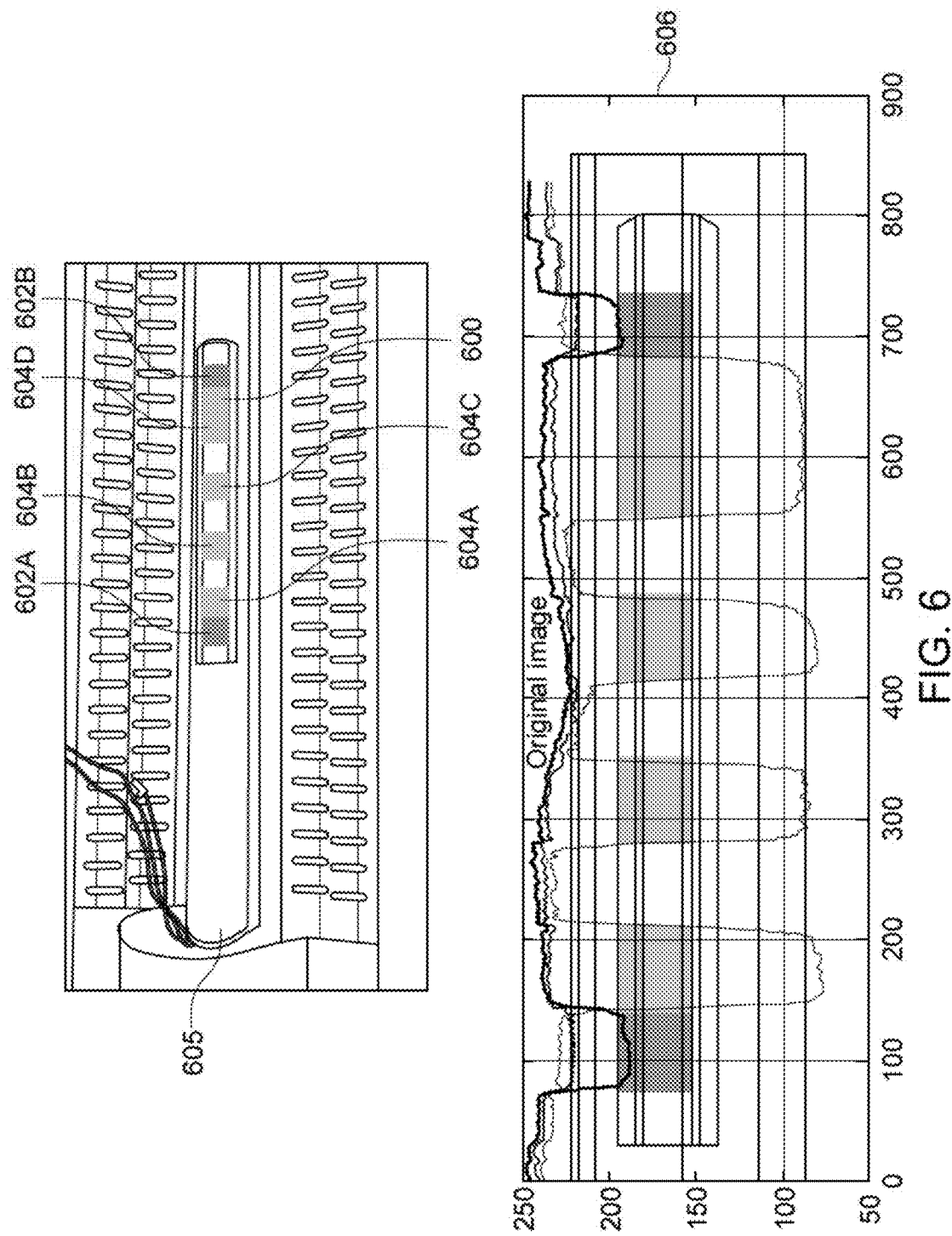
FIG. 6 shows a linear color band code comprising two cyan color regions at each end, and four spaced apart yellow color regions sandwiched between the cyan color regions affixed upon a transmissive surface of a fixture in accordance with an embodiment.

FIG. 6 shows a linear color band code 600 comprising two cyan color regions 602A, 602B at each end, and four spaced apart yellow color regions 604A-604D sandwiched between the cyan color regions 602A, 602B affixed upon a transmissive surface of a fixture 605 in accordance with an embodiment. FIG. 6 further shows graphs 606 of the tristimulus values superimposed upon each of the color regions. In the embodiment of FIG. 6, the cyan color regions 602A, 602B function as a head indicating a beginning of the code and a tail indicating an end of the code, respectively. The yellow regions 604A-604D are used to encode information, such as a unique identifier.

Figure 7:
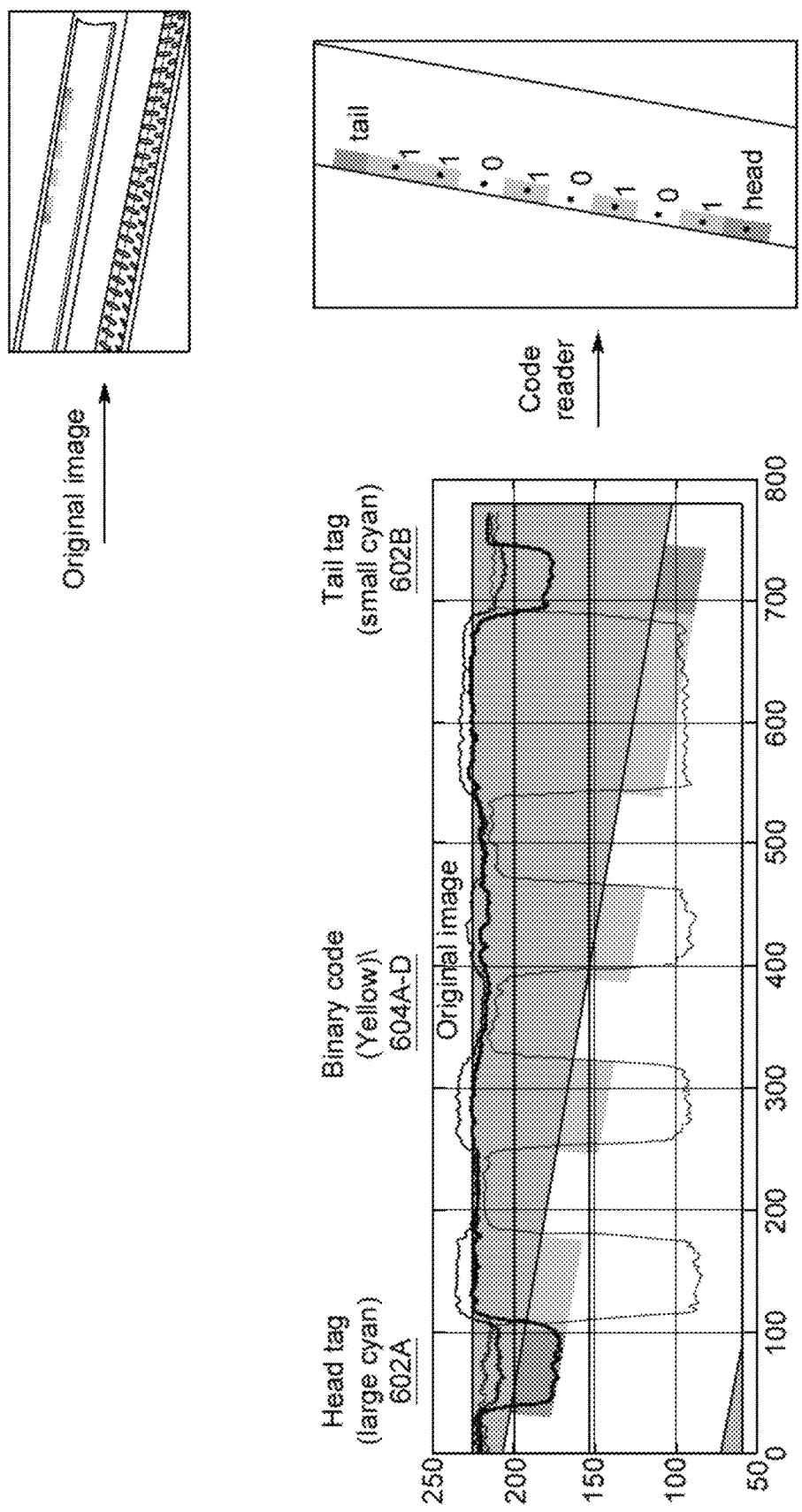
FIG. 7 depicts an image of the linear code 600 of FIG. 6 acquired at an angle which is not normal to the fixture.

FIG. 7 depicts an image of the linear code 600 of FIG. 6 acquired at an angle which is not normal to the fixture. FIG. 7 shows that even if an image of the fixture of FIG. 6 is acquired at an angle which is not normal to the fixture ("straight on"), the determination using detected changes in each of the tristimulus values for the image data can still identify, locate, count, and size the color regions in order to decode the code. In the embodiment of FIG. 7, each of the yellow regions 604A-604C is representative of a binary "1" values, and yellow region 604D of a larger size is representative of two binary "1" values. The white regions between the yellow regions 604A-604C are representative of binary "0" values. The resultant binary code when decoded by a code reader has values of "10101011".

Figure 8:
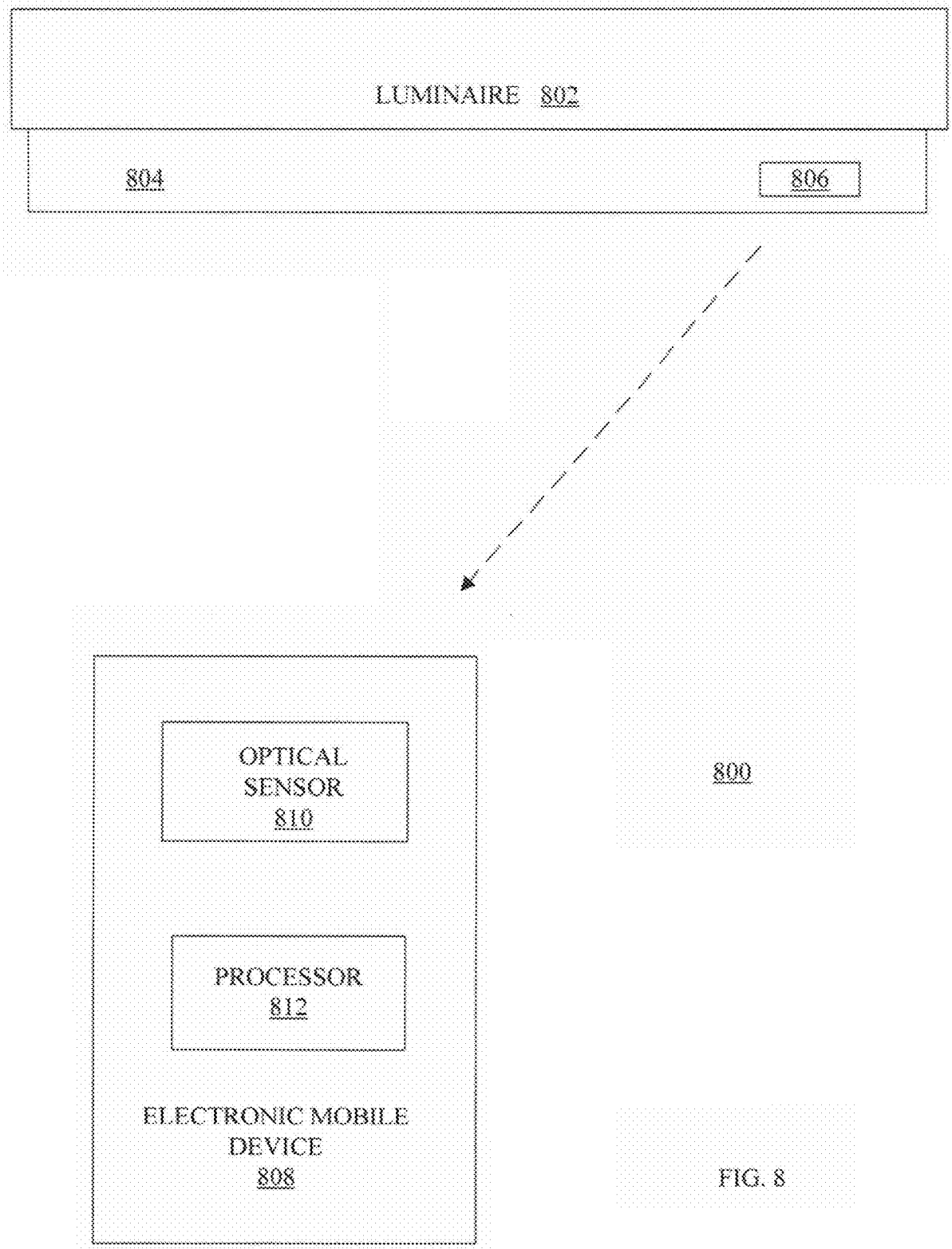
FIG. 8 depicts a system 800 for indoor positioning in accordance with some embodiments.

FIG. 8 depicts a system 800 for indoor positioning in accordance with some embodiments. The system 800 includes one or more light sources 802 each having a transmissive surface 804. In the particular embodiment illustrated in FIG. 8, the light source 802 is a luminaire. The transmissive surface 804 includes a color band code 806 comprising color regions at least partially modifying visible light of the light source. In one or more embodiments, the color band code 806 is configured as a color band code including color regions representative of data as discussed herein with respect various embodiments. In particular embodiments, the color band code is representative of data indicative of a unique identifier for the light source.

The system 800 further includes one or more electronic mobile devices 808 each including an optical sensor 810 and one or more processors 812. The optical sensor 812 is configured to obtain image data of the one or more light sources 802 including the color band code 806. The color regions of the color band code 806 at least partially modify visible light of the one or more light sources prior to the visible light impinging the optical sensor. The one or more processors 812 associated with the electronic mobile device 808 are configured to determine one or more characteristics of the color band code 806 of the one or more light sources 802 based on the image data that is obtained. The one or more associated processors 812 are also configured to determine a location for the one or more light sources 802 and/or for the one or more electronic mobile devices 808, within a structure, based on the one or more characteristics of the color band code that are determined.

In a particular embodiment, one or more electronic mobile devices may obtain image data associated with multiple light sources each having a color band code representative of a unique identifier, determine the unique identifier of each of the light sources based upon the image data, and determine a position or location for each of the light sources and/or for the one or more electronic mobile devices within a structure.

Figure 9:
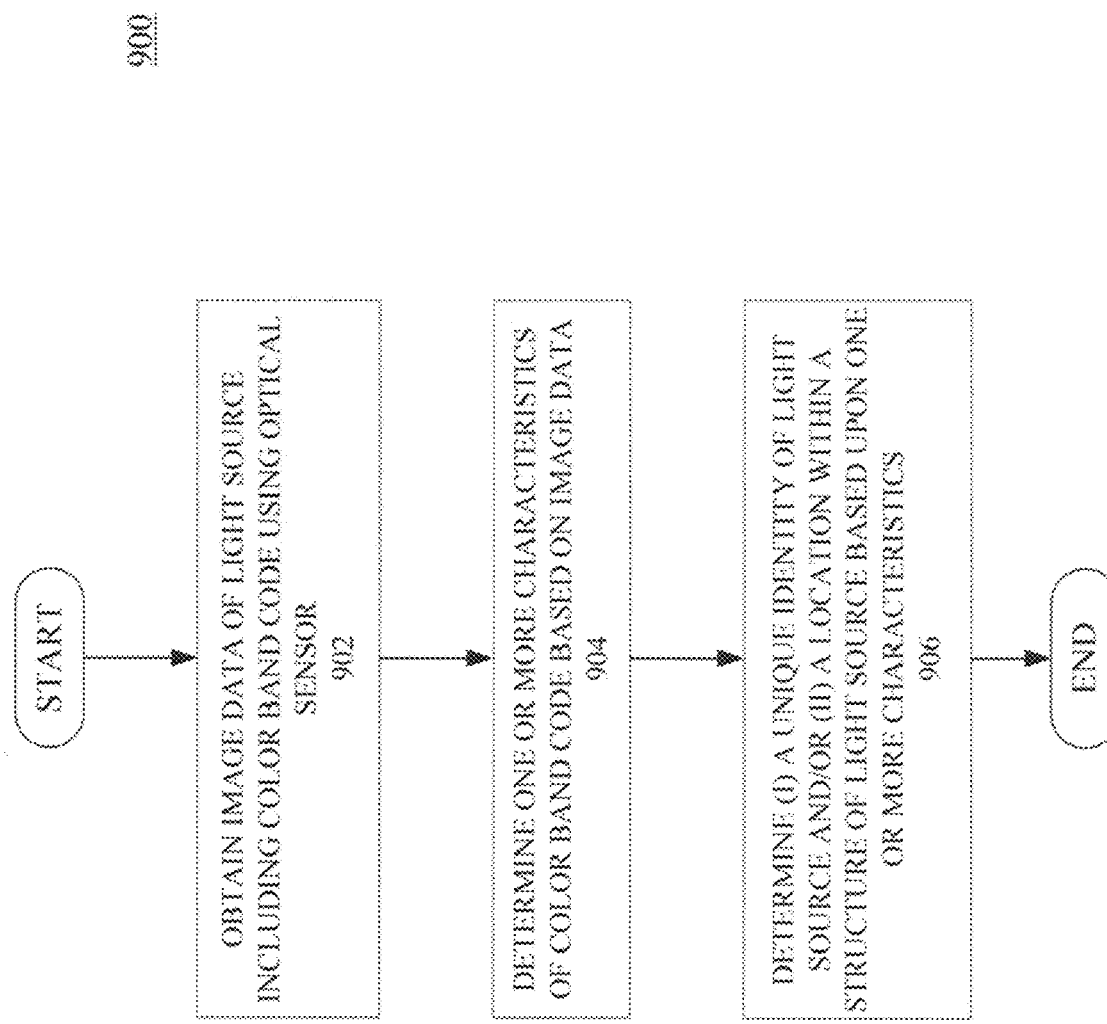
FIG. 9 illustrates a method 900 for uniquely identifying light sources in accordance with some embodiments.

FIG. 9 illustrates a method 900 for uniquely identifying light sources in accordance with some embodiments. For example, the method 900 may be performed by a computing system such as an electronic mobile device. In 902, image data of a light source comprising a surface including a color band code disposed thereon is obtained using an optical sensor. The color band code includes color regions at least partially modifying visible light of the light source prior to the light impinging the optical sensor. In 904, one or more characteristics of the color band code are based on the image data that is obtained. In 906, one or more of the following steps are performed: (i) determining a unique identity of the light source based on the one or more characteristics of the color band code that are determined, and/or (ii) determining a location within a structure of the light source, based on the one or more characteristics of the color band code that are determined.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 10 illustrates an example computing system 1000 which may represent or be integrated in any of the above-described components, etc. FIG. 10 is not intended to suggest any limitation as to the scope of use or functionality of embodiments described herein. The computing system 1000 is capable of being implemented and/or performing any of the functionality set forth hereinabove.

The computing system 1000 may include a computer system/server, which is operational with numerous other general purpose or special purpose computing system environments or configurations. Examples of well-known computing systems, environments, and/or configurations that may be suitable for use as computing system 1000 include, but are not limited to, personal computer systems, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, databases, and the like, which may include any of the above systems or devices, and the like. According to various embodiments described herein, the computing system 1000 may be a tokenization platform, server, CPU, or the like.

The computing system 1000 may be described in the general context of computer system-executable instructions, such as program modules, being executed by a computer system. Generally, program modules may include routines, programs, objects, components, logic, data structures, and so on that perform particular tasks or implement particular abstract data types. The computing system 1000 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 10, the computing system 1000 is shown in the form of a general-purpose computing device. The components of computing system 1000 may include, but are not limited to, a network interface 1010, one or more processors or processing units 1020, an input/output 1030 which may include a port, an interface, etc., or other hardware, for inputting and/or outputting a data signal to another device such as a display, a printer, etc., and a storage device 1040 which may include a system memory, or the like. Although not shown, the computing system 1000 may also include a system bus that couples various system components including system memory to the processor 1020.

The storage 1040 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 1040 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 1040 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 1000 may also communicate with one or more external devices such as a keyboard, a pointing device, a display, etc.; one or more devices that enable a user to interact with computer system/server; and/or any devices (e.g., network card, modem, etc.) that enable computing system 1000 to communicate with one or more other computing devices. Such communication can occur via I/O interfaces. Still yet, computing system 1000 can communicate with one or more networks such as a local area network (LAN), a general wide area network (WAN), and/or a public network (e.g., the Internet) via network interface 1010. As depicted, network interface 1010 may also include a network adapter that communicates with the other components of computing system 1000 via a bus. Although not shown, other hardware and/or software components could be used in conjunction with the computing system 1000. Examples include, but are not limited to: microcode, device drivers, redundant processing units, external disk drive arrays, RAID systems, tape drives, and data archival storage systems, etc.

In these examples, the computing system 1000 may implement one or more of the response measurement, DC link property computation, long term analysis, and other functions described herein. As another example, the computing system 1000 may be attached to or otherwise coupled with a DC microgrid bus.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular light sources, any of the embodiments described herein could be applied to other types of lighting components.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A method comprising:
 using an optical sensor, obtaining image data of a light source comprising a surface, the surface including a color band code comprising an array of color regions at least partially modifying visible light of the light source prior to the light impinging on the optical sensor, the color band code further comprising secondary regions denoting the boundaries of the color band code;

determining one or more characteristics of the color band code based on the image data that is obtained between the secondary regions; and at least one of determining a unique identity of the light source based on the determined one or more characteristics of the color band code, or determining a location within a structure associated with the light source based on the determined one or more characteristics of the color band code.

2. The method of claim 1, wherein the surface is a light transmissive surface.

3. The method of claim 1, wherein the surface is a light reflective surface.

4. The method of claim 1, wherein the color band code is a sticker affixed to the surface.

5. The method of claim 1, wherein the array of color regions are selectively colored in a pattern with a first color, in order to represent the unique identity.

6. The method of claim 5, wherein the secondary regions comprise at least one second color region of a second color, the second color representative of a boundary of the color band code.

7. The method of claim 6, wherein the first color is different than the second color.

8. The method of claim 6, wherein the boundary includes at least one of a head of the color band code or a tail of the color band code.

9. The method of claim 8, wherein a size of the head is different than a size of the tail.

10. The method of claim 6, wherein the array of color regions include at least one third color region of a third color, the second color region representative of a head of the color band code, and the third color region representative of a tail of the color band code.

11. The method of claim 10, wherein the second color is different than the third color.

12. The method of claim 1, wherein the array of color regions are representative of a binary code.

13. An electronic mobile device comprising:
an optical sensor configured to obtain image data of a light source comprising a surface, the surface including a color band code comprising an array of color regions at least partially modifying visible light of the light source prior to the light impinging on the optical sensor, the color band code further comprising secondary regions denoting the boundaries of the color band code; and
one or more associated processors configured to determine one or more characteristics of the color band code based on the image data that is obtained between the secondary regions,
the one or more associated processors also configured to at least one of:
(i) determine a unique identity of the light source based on the one or more characteristics of the color band code that are determined, or
(ii) determine a location within a structure of the light source and/or the electronic mobile device, based on the one or more characteristics of the color band code that are determined.

14. A system for indoor positioning, the system comprising:
one or more light sources, each comprising a surface, the surface including a color band code comprising an array of color regions at least partially modifying visible light of the light source and secondary regions denoting the boundaries of the color band code, the color band code representative of data indicative of a unique identifier for the light source; and
one or more electronic mobile device comprising:
an optical sensor configured to obtain image data of the one or more light sources, the color regions at least partially modifying visible light of the one or more light sources prior to the visible light impinging on the optical sensor; and
one or more processors associated with the electronic mobile device and configured to determine one or more characteristics of the color band code of the one or more light sources, based on the image data that is obtained between the secondary regions of the color band code, the one or more associated processors also configured to determine a location for the one or more light source or for the one or more electronic mobile device, within a structure, based on the one or more characteristics of the color band code that are determined.

15. The system of claim 14, wherein the color regions are representative of a binary code.

16. A non-transitory computer-readable medium having stored thereon instructions which when executed by a processor cause the processor to:
receive image data of a light source comprising a surface from an optical sensor, the surface including a color band code comprising an array of color regions at least partially modifying visible light of the light source prior to the light impinging on the optical sensor, the color band code further comprising secondary regions denoting the boundaries of the color band code;
determine one or more characteristics of the color band code based on the image data that is obtained between the secondary regions; and
at least one of:
(i) determine a unique identity of the light source based on the determined one or more characteristics of the color band code, or (ii) determine a location within a structure associated with the light source based on the determined one or more characteristics of the color band code.

17. A luminaire comprising:
a light source emitting visible light and a light-receiving surface selected from the group consisting of light-transmissive surface, light-reflective surface and combinations thereof, the light source in optical communication with the light-receiving surface,
the light-receiving surface comprising a color band code including an array of color regions and secondary regions denoting the boundaries of the color band code, the array of color regions at least partially modifying the visible light prior to the light impinging on an optical sensor of an electronic mobile device;
wherein the color band code encodes at least machine-readable data indicative of a unique identifier of the luminaire.

18. The luminaire of claim 17, wherein the color band code comprises a transparent or translucent layer including an array of color regions, the layer applied or affixed to the light-receiving surface.

19. A method of assembling the luminaire of claim 17, the method comprising at least the step of:
applying or affixing the color band code comprising a transparent or translucent layer including an array of color regions and secondary regions denoting the boundaries of the color band code, to an existing luminaire comprising (i) a light source emitting visible light and (ii) a light-receiving surface selected from the group consisting of light-transmissive surface, light-reflective surface and combinations thereof, the light source in optical communication with the light-receiving surface.

* * * * *